United States Patent
Laurent et al.

(10) Patent No.: US 9,729,762 B2
(45) Date of Patent: Aug. 8, 2017

(54) METHOD FOR SYNCHRONIZING MULTIMEDIA FLOWS AND CORRESPONDING DEVICE

(75) Inventors: Anthony Laurent, Vignoc (FR); Eric Gautier, Rennes (FR); Yvon Legallais, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 13/878,216

(22) PCT Filed: Oct. 14, 2011

(86) PCT No.: PCT/EP2011/068016
§ 371 (c)(1),
(2), (4) Date: Apr. 6, 2013

(87) PCT Pub. No.: WO2012/049305
PCT Pub. Date: Apr. 19, 2012

(65) Prior Publication Data
US 2013/0335629 A1 Dec. 19, 2013

(30) Foreign Application Priority Data

Oct. 15, 2010 (FR) .................................... 10 58421

(51) Int. Cl.
*H04N 7/173* (2011.01)
*H04N 5/04* (2006.01)
(Continued)

(52) U.S. Cl.
CPC ............. *H04N 5/04* (2013.01); *H04N 21/236* (2013.01); *H04N 21/2389* (2013.01);
(Continued)

(58) Field of Classification Search
CPC ................................................. H04N 21/4307
See application file for complete search history.

(56) References Cited

U.S. PATENT DOCUMENTS 6,415,438 B1 *  7/2002  Blackketter ............. H04N 5/44
                                                            725/32
6,583,821 B1    6/2003  Durand
(Continued)

FOREIGN PATENT DOCUMENTS

CN          1282068         1/2001
CN      WO2008055420        5/2008
(Continued)

OTHER PUBLICATIONS

Hurst et al;"MPEG Slicing:A New Standard for Television—SMPTE 312M", SMPTE—Motion Imagaing Journal, Society of Motion Culture and Television Engineers, White Plains, NY, US.
(Continued)

*Primary Examiner* — Fernando Alcon
(74) *Attorney, Agent, or Firm* — Brian J. Dorini; Catherine A. Cooper

(57) ABSTRACT

The present invention relates to a reception device and a method for the processing of multimedia data flows in said device comprising an interface to a first network and an interface to a second network, said method comprising the following steps: receive, from the first network, a first flow comprising multimedia data through a first transport protocol fitted with a first data synchronization system; receive, from the second network, a second flow comprising multimedia data through a second transport protocol fitted with a second data synchronization system, said second synchronization system being based on timing references different from those of the first data synchronization system; characterized in that said first and second flows transport the same synchronization information in the payload field of the first and of the second transport protocol, said synchronization information comprising data indicating the moment from which said multimedia data must be rendered; synchronize said first and second flows by using said synchronization
(Continued)

information; and perform a step for rendering said first and second multimedia flows.

8 Claims, 5 Drawing Sheets

(51) Int. Cl.

| | | |
|---|---|---|
| *H04N 21/236* | (2011.01) | |
| *H04N 21/2389* | (2011.01) | |
| *H04N 21/43* | (2011.01) | |
| *H04N 21/434* | (2011.01) | |
| *H04N 21/4385* | (2011.01) | |
| *H04N 21/44* | (2011.01) | |
| *H04N 21/61* | (2011.01) | |
| *H04N 21/63* | (2011.01) | |
| *H04N 21/6437* | (2011.01) | |
| *H04N 21/845* | (2011.01) | |

(52) U.S. Cl.
CPC ....... *H04N 21/434* (2013.01); *H04N 21/4307* (2013.01); *H04N 21/4385* (2013.01); *H04N 21/44004* (2013.01); *H04N 21/6112* (2013.01); *H04N 21/6125* (2013.01); *H04N 21/631* (2013.01); *H04N 21/6437* (2013.01); *H04N 21/8455* (2013.01)

(56) References Cited

U.S. PATENT DOCUMENTS

| 6,778,756 B1 | 8/2004 | Fujimura et al. |
|---|---|---|
| 7,379,463 B2 | 5/2008 | Tomita |
| 7,657,645 B2 | 2/2010 | Xu |
| 2004/0019911 A1 | 1/2004 | Gates et al. |
| 2007/0118850 A1 | 5/2007 | Bertin |
| 2009/0157895 A1 | 6/2009 | Van Den Berghe |
| 2010/0100917 A1 | 4/2010 | Chiao et al. |

FOREIGN PATENT DOCUMENTS

| CN | 101465849 | 6/2009 |
|---|---|---|
| EP | 2073548 | 6/2009 |
| FR | 2859859 | 3/2005 |
| JP | 2001069459 | 3/2001 |
| JP | 2004088366 | 3/2004 |
| JP | 2007060524 | 3/2007 |
| WO | WO2007132405 | 11/2007 |
| WO | WO2008092960 | 8/2008 |
| WO | WO2009150578 | 12/2009 |

OTHER PUBLICATIONS

DR Uwe Rauschenbach et al;"A scalable Interactive TV Service Supporting Synchronized Delivery Over broadcast and Broadband Networks" International Broadcasting Conference 2004;Sep. 10, 2004-Sep. 14, 2004.
J.Brassil et al_Structuring Internet Media Streams With Cueing Protocols_IEEE/ACM Transactions on Networking.
French Search Report Dated Jun. 29, 2011.
Int'l Search Report Dated Dec. 13, 2011.
ETSI TS 102 823 V1.1.1: "Specification for the carriage of synchronized auxiliary data in DVB transport streams" Digital Video Broadcasting, Nov. 2005.
Jacobson et al: "RFC 3550—RTP_A Transport Protocol for Real-Time Applications", The Internet Society, Jul. 2003.
Radhakrishnan et al: "Audio and Video Signatures for Synchronization", ICME 2008.
ISO/IEC JTC1/SC29/WG11: "MPEG Media Transport (MMT) Context and Objective", Geneva, Switzerland, Jul. 2010.
Stockhammer et al: "Dynamic Adaptive Streaming over HTTP—Standards and Design principles" ACM Multimedia Systems Conference (MMSys) Feb. 2011.
ITU-R BT.1359: "Relative Timing of Sound and Vision for Broadcasting", 1998.
Schulzrinne et al: "Real Time Streaming Protocol (RTSP)", IETF Network Working Group 2326, Apr. 2008.
ETSI/TS 102 323 V1.4.1: "Carriage and signaling of TV Anytime information in DVB transport streams", Digital Video Broadcasting, Jan. 2010.
ETSI TS 102 809 V1.1.1: "Signaling and carriage of interactive applications and services in hybrid broadcast/broadband environments" revision 1, Digital Video Broadcasting, Jan. 2010.
ISO/IEC 13818 1: "Generic coding of moving pictures and associated audio information: Systems", Third ed., Oct. 15, 2007.
ISO/IEC 14496 12: "Information technology Coding of audio visual objects", ISO Base Media file format, Second ed., Apr. 1, 2005.
ISO/IEC 14496 14: "Coding of moving pictures and audio", MP4 File format, Oct. 25, 2002.
Howson et al: "Second Screen TV Synchronization" ICCE Berlin 2011.
Howson et al: "Combining future Internet media with broadcast TV content", NEM Summit, Sep. 27, 2011.
ISO/IEC JTC1/SC29 WG11 N11542: "Use Cases for MPEG Media Transport (MMT)", Geneva, Switzerland, Jul. 2010.
ISO/IEC JTC1/SC29 WG11 N11539: "Call for Proposals on MPEG Media transport (MMT)", Geneva, Switzerland Jul. 2010.

\* cited by examiner

FIG. 5

| 0 1 2 3 4 5 6 7 | 8 9 0 1 2 3 4 5 | 6 7 8 9 0 1 2 3 4 5 6 7 8 9 | 0 1 |
|---|---|---|---|
| BT desc type | BT desc length | BT Id | R T C P N RS |
| res tick format | | | |
| ticks | | info length | absolute |
| metadata application format | | CL desc type | F CTBI res | CL desc length |
| CLI_type | | CLI_length | CRIR length |
| CLI byte 3 | | CLI byte 1 | CLI byte 2 |
| . . . | | . . . | CLI byte N |
| TBAD length | | reserved | M BT ID |

FIG. 6

| 0 1 2 3 4 5 6 7 | 8 9 0 1 2 3 4 5 | 6 7 8 9 0 1 2 3 4 5 6 7 8 9 | 0 1 |
|---|---|---|---|
| BT desc type | BT desc length | BT Id | R T C P N RS |
| res tick format | | | |
| ticks | | info length | absolute |
| duration ticks | | | prefetch period |
| metadata application format | | CL desc type | F CTBI res | CL desc length |
| CLI_type | | CLI_length | CRIR length |
| CLI byte 3 | | CLI byte 1 | CLI byte 2 |
| . . . | | . . . | CLI byte N |
| TBAD length | | reserved | M BT ID |

METHOD FOR SYNCHRONIZING MULTIMEDIA FLOWS AND CORRESPONDING DEVICE

This application claims the benefit, under 35 U.S.C. §365 of International Application PCT/EP2011/068016, filed Oct. 14, 2011, which was published in accordance with PCT Article 21(2) on Apr. 19, 2012 in English and which claims the benefit of French patent application No. 1058421, filed Oct. 15, 2010.

TECHNICAL DOMAIN OF THE INVENTION

The present invention relates to the processing of multimedia flows from different multimedia sources or transmitted via different transport protocols and restored on a rendering device.

TECHNOLOGICAL BACKGROUND OF THE INVENTION

In broadcast TV, the audio and video flows are traditionally broadcast together. They are generally provided by a single multimedia source, for example a supplier of multimedia contents, then transported by a single transport protocol over a given transport network then delivered to a single end user device, for example a decoder or a television, in charge of reading these flows, displaying the video data on a screen and broadcasting the audio data on a loudspeaker.

With the rapid development of the Internet network and mobile telecommunication networks new multimedia applications have appeared in which the sources and/or the transport protocols can be different for the audio flows and the video flows. Interactive applications have also appeared for which the sources and transport protocols can also be different from those of the audio-video contents to which they refer. These applications can in this way be transported through broadband networks.

For these new applications, it is necessary to make sure that the rendering of the audio flow is synchronous with the rendering of the video flow, or that the interactive application is synchronously rendered with the audio-video flow.

An example of new multimedia application is the generation of an audio flow by a source different from that of the video flow, this audio flow being intended to substitute itself for a basic audio flow which would be provided with the video flow. For example, in the case of a football match broadcast on the television, it is possible to substitute for the basic audio flow provided with the video flow of the match an audio flow comprising the example comments in a language other than that of the basic audio flow which would be delivered by another multimedia supplier than the match broadcaster. In order that the audio flow can be synchronized with the video flow, the said flows must contain common or equivalent timing references. As a general rule, the transport protocol provides these references or timestamps to the rendering device so that it regulates and synchronizes the rendering of the two flows.

The timestamp is generally a counter value which indicates the time during which the event associated with this timestamp occurs. The clock frequency of the counter must be a value known by the rendering device so that it correctly regulates the flow rendering. The manner in which this clock frequency is given to the rendering device is described in the specifications of the transport layers (MPEG-TS, RTP, etc.).

In order that the rendering device can synchronize the two flows, the latter generally refer to a common clock commonly called "wall clock". For example, in the case of the RTP protocol (for Real-Time Transport Protocol) specified by the IETF according to RFC 3550, a transmitter periodically transmits a message called RTCP (for Real-time Transport Control Protocol) broadcast report indicating the equivalence between the timestamp and the time given by the common clock. If the audio and video flows are provided by different sources, these two sources must share the same common clock. The NTP protocol (for Network Time Protocol) is typically used to synchronize the two sources on the same clock.

However, when the two sources are not connected by a sufficiently reliable network in terms of transport time, another synchronization mechanism is then necessary.

This synchronization problem can also exist between two video flows which are displayed on a single rendering device, one of the video contents being displayed by picture in picture in the other one, when the two flows are not provided by the same source or the same transport protocol. The Picture in Picture function is an example of this. Another example concerns cases of 2D to 3D transition where a 2D video is received in the broadcast flow and the 3D complement enabling a 3D display is received in the broadband flow.

GENERAL DESCRIPTION OF THE INVENTION

The present invention relates to an object capable of solving synchronization problems when flows are distributed over networks having different time bases.

For this purpose, the purpose of the invention is a method for the processing of multimedia data flows in said device comprising an interface to a first network and an interface to a second network, said method comprising the following steps: receive, from the first network, a first flow comprising multimedia data through a first transport protocol fitted with a first data synchronization system; receive, from the second network, a second flow comprising multimedia data through a second transport protocol fitted with a second data synchronization system, said second synchronization system being based on timing references different from those of the first data synchronization system; said first and second flows transporting the same synchronization information in the data field of the first and of the second transport protocol, said synchronization information comprising data indicating the moment from which said multimedia data must be rendered; synchronize said first and second flows by using said synchronization information; and perform a step for rendering said first and second multimedia flows.

The invention has the advantages of proposing an independent synchronization system complementary to those used by the respective transport protocols.

According to one embodiment, said transport protocols are of the MPEG-2 TS and/or RTP type.

According to one embodiment, the synchronization information is based on the timing references of one of the transport protocols.

According to one embodiment, the synchronization step comprises a step for delaying the contents received in advance by a memorization, until the contents can be rendered synchronously.

According to one embodiment, the first flow is received on the first network in broadcast mode, and comprises countdown information indicating when first multimedia data to be received on the first network will have to be rendered, the second multimedia data of the second flow being pre-loaded upon request of said reception device on the second network sufficiently in advance to enable the reception device to render them synchronously with the first multimedia data when they are received.

Another purpose of the invention relates to a reception device comprising an interface to a first network enabling a first flow comprising multimedia data to be received through a first transport protocol fitted with a first data synchronization system; and an interface to a second network, enabling a second flow comprising multimedia data to be received through a second transport protocol fitted with a second data synchronization system, said second synchronization system being based on timing references different from those of the first data synchronization system; a synchronizer to synchronize said first and second flows by using synchronization information transported in the first and second flows and comprising data indicating when said multimedia data must be rendered; and a third interface enabling said first and second multimedia flows to be transmitted synchronously.

The invention also applies to a computer program product comprising program code instructions for the execution of the steps of the method according to the invention, when this program is executed on a computer. "Computer program product" is understood to mean a computer program medium that can consist not only in a storage space containing the program, such as a computer memory, but also a signal, such as an electrical or optical signal.

BRIEF DESCRIPTION OF THE FIGURES

The invention will be better understood and illustrated by means of the following embodiments and implementations, by no means limiting, with reference to the figures attached in the appendix, wherein:

FIG. 5 is a table that shows the RTP packet fields and values.

FIG. 6 is a table that shows the RTP packet fields and values for the second embodiment.

In FIGS. 1 and 4, the modules shown are functional units that may or may not correspond to physically distinguishable units. For example, these modules or some of them can be grouped together in a single component, or constitute functions of the same software. On the contrary, some modules may be composed of separate physical entities.

DESCRIPTION OF A PREFERRED EMBODIMENT OF THE INVENTION

The embodiments are placed within the framework of content distribution through two communication networks and according to two different data transport protocols, namely RTP and MPEG-2 TS, but the invention is not limited to this particular environment and can apply within other data distribution systems.

Figure 1:
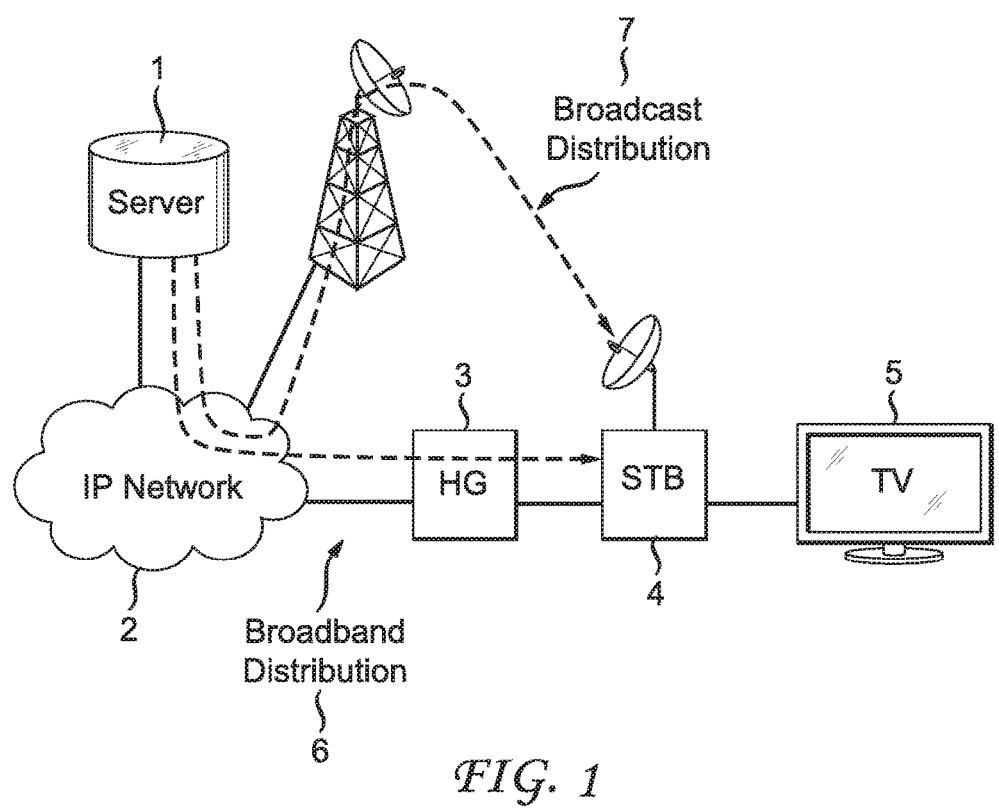
FIG. 1 is a content distribution system according to an embodiment of the invention.

A content distribution system according to an embodiment of the invention is illustrated in FIG. 1. It comprises a server 1 of the audio-video server type. The server broadcasts an audio-video content through a broadcast network noted as broadcast network 7. The broadcast network is of the DVB-T type and transports audio-video data according to the MPEG-2 transport stream transport protocol, noted as MPEG-2 TS, and specified in ISO standard ISO/IEC 13818-1 standard: "Information technology—generic coding of moving pictures and associated audio information: Systems", and noted as ISO/IEC 13818-1. The broadcast network is here of the unidirectional type, but the invention naturally applies to any type of broadcast network and is also not limited to the MPEG-2 TS transport protocol.

The audio-video content is received by a video decoder 4, noted as STB (for set-top box). The STB decodes the audio-video content and transmits the decoded content to a television set, TV 5.

According to the MPEG-2 TS protocol, timing references are transmitted to the decoder. The transport stream comprises Program Clock Reference (also noted as PCR) packets that are samples of the system time clock (STC) contained in the server. They are used to synchronize the clock system in the decoder. The elementary streams of a given service contain packets that contain a presentation timestamp (also noted as PTS) which represent the time during which the data transported in the packet should be rendered.

The same server is accessible by the STB through a broadband distribution network, or broadband network 2. In particular, the broadband network uses the Internet network 2 accessible to the STB through a home gateway, noted as HG 3. This network is of the bidirectional type and enables the gateway to transmit and to receive data to the server and more generally to any type of server accessible through the Internet network.

According to the embodiment, the server makes accessible to the STB a second audio flow complementary to the broadcast audio-video content. This second audio flow can be received by the STB by means of the RTP/RTCP transport protocol. Hence, once received, the audio flow is decoded and transmitted to the television set. The RTCP protocol indicates to the decoder the equivalence between the presentation timestamp and the time given by the common clock according to the Network Time Protocol (NTP).

According to the embodiment of the invention, although the audio-video flow and the second audio flow are transmitted by two different networks using different transport protocols, they are played synchronously in the television set. Indeed, an item of synchronization information is transmitted by the server in the form of auxiliary data packet. This information enables the STB to synchronize the audio-video flow rendering time on that of the second audio. In practice, only the video part of the audio-video flow is rendered, and the second audio is rendered synchronously.

Figure 2:
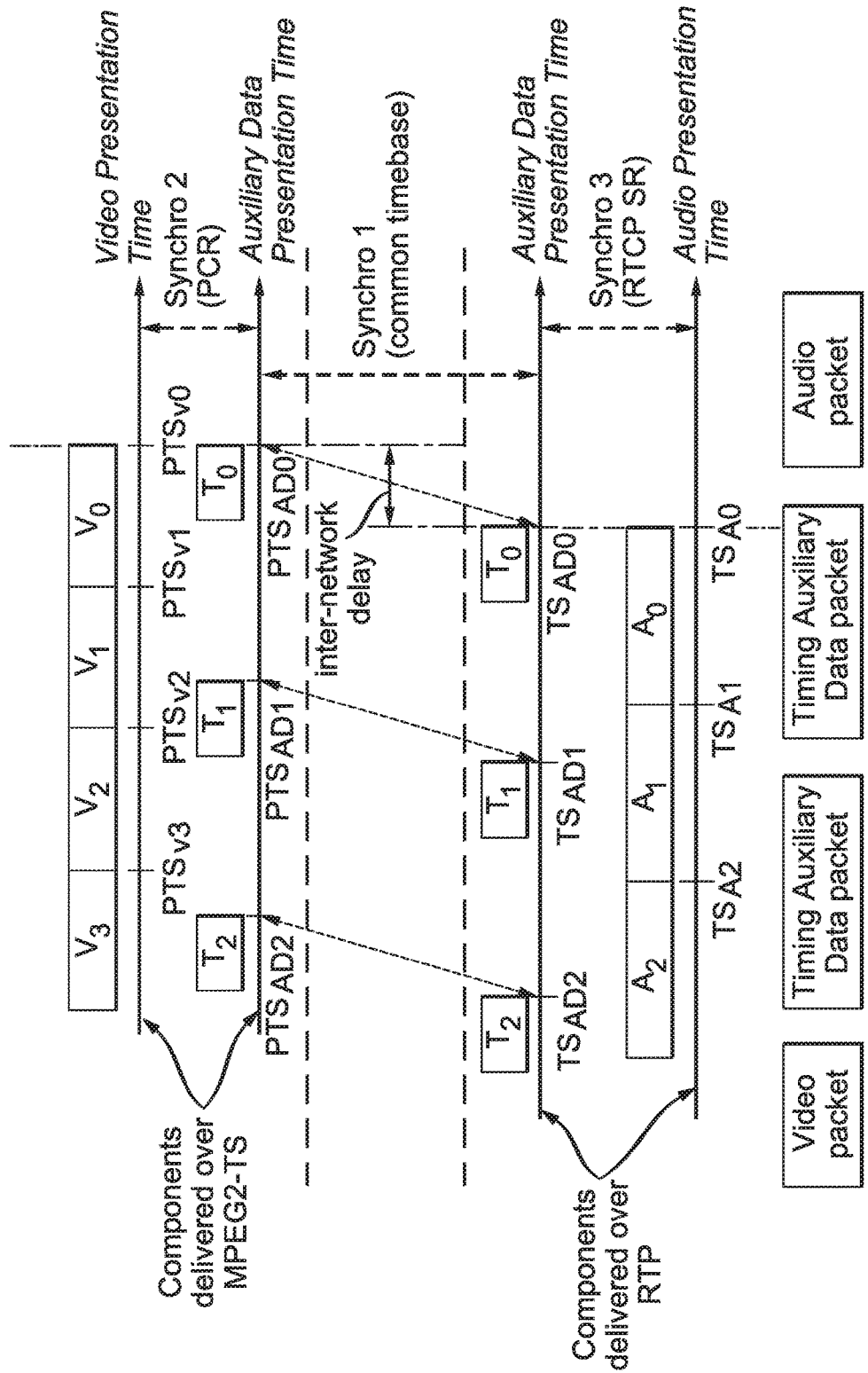
FIG. 2 is a content distribution block diagram according to an embodiment of the invention.

FIG. 2 illustrates the data transport according to the MPEG-2 TS protocol in broadcast mode and according to the RTP/RTCP protocol in broadband mode. In broadcast, mode, the video frames V0 to V3 are broadcast with corresponding presentation timestamps packets PTSv0 to PTSv3. In broadband, mode, the audio frames A0 to A2 are transported with corresponding presentation timestamps packets TSA0 to TSA2.

In accordance with the embodiment, auxiliary data packets T0 to T2 are associated with the video and audio flows and are transmitted over the two networks by using the same transport protocol as the flows with which they are associated. On each network, the auxiliary data packets and the multimedia flow are synchronized by means of the synchronization protocol specific to the transport protocol. The auxiliary data packets transport temporal synchronization data. This data can be assimilated with a timeline and represents a counter value from a given time, for example the beginning of the current event. A video frame broadcast over the broadcast network and an audio frame broadcast over the broadband network that must be rendered at the same time will refer to the same timeline value.

The synchronization data transported over the two networks use the same format. This format can be different from those of the timing references used by the transport protocols.

They enable the receiver to match the PCR clock reference with the NTP clock reference. In other words, this enables to measure the time between the contents presentation.

The decoder can adjust in this way the audio presentation with respect to the video. In particular if the video is received in advance, it is memorized for a sufficiently long time to enable audio rendering synchronously. More generally, the receiver memorizes the data received in advance to present them synchronously with the data received late.

However, within the framework of MPEG-2 TS, a temporal model imposes not to delay the data rendering. More precisely, the time between the data encoding and the data presentation must remain constant. Therefore, this does not allow to delay the rendering of video data in the case of the embodiment.

Figure 3:
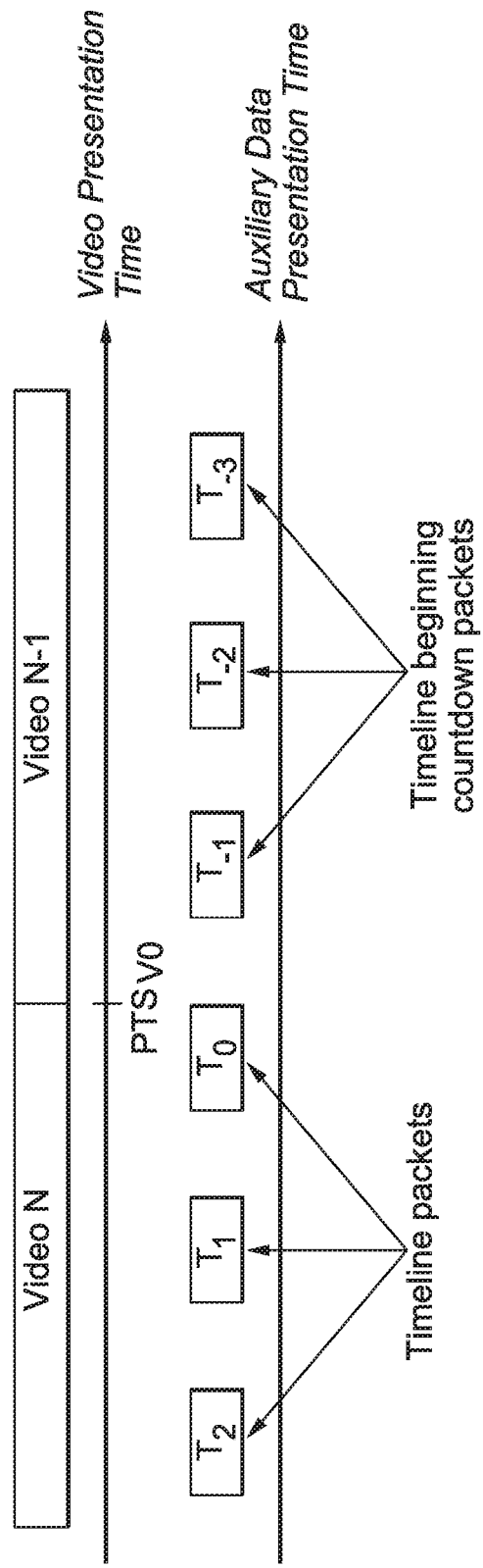
FIG. 3 is a content distribution block diagram according to another embodiment of the invention.

This is why, in a second embodiment, the decoder receives information indicating to it in advance when a content to come will be played. These are countdown information indicating the beginning of a timeline. More precisely, as illustrated in FIG. 3, if the content must begin to be rendered at the time corresponding to that indicated in the auxiliary data T0, an item of information $T_{-3}$, $T_{-2}$, $T_{-1}$ is received in advance by the receiver indicating to it when this time T0 will begin. This makes it possible for it to recover in advance, in a mode called pre-fetch mode, the audio data corresponding at the video that will be rendered at time T0. These information are received over the networks of the broadcast type and are intended to enable the terminals to pre-load in advance the broadband component. They enable the decoder to issue requests to receive the data in advance.

Figure 4:
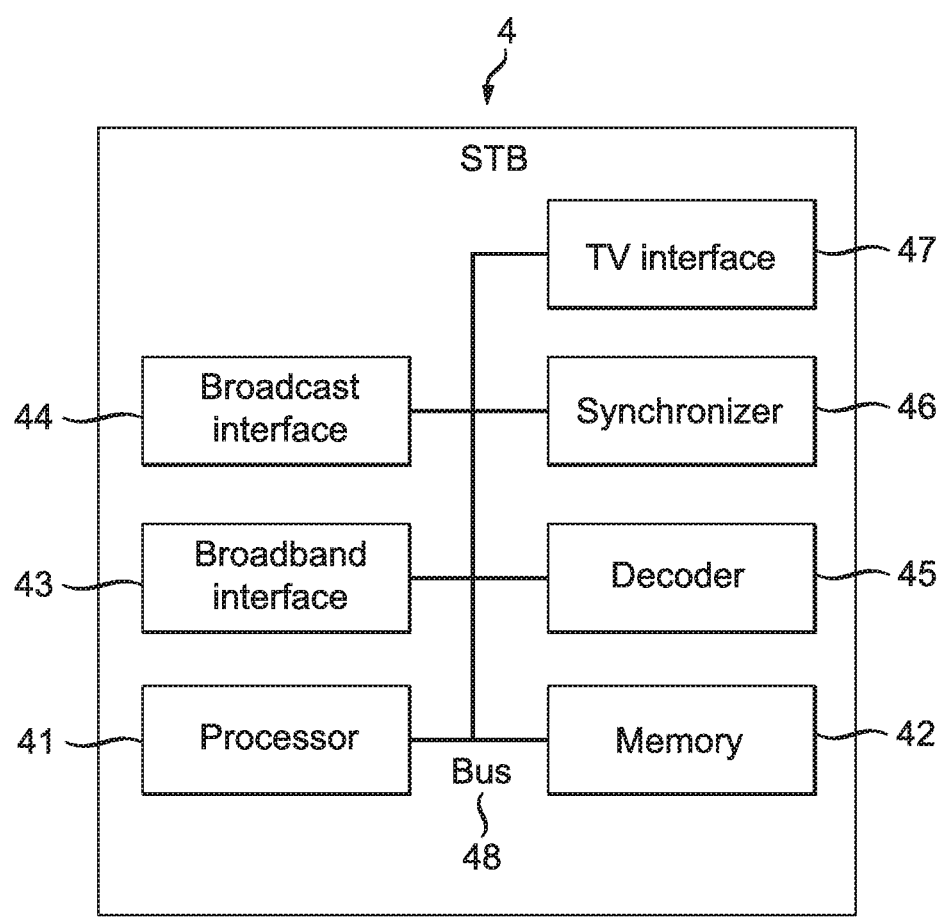
FIG. 4 is a decoder according to an embodiment of the invention.

A STB according to the embodiments is illustrated in FIG. 4. It comprises an interface 44 to the broadcast distribution network 7, an interface 43 to the broadband network 6, and an interface 47 to a television set 5. It comprises an audio-video decoder 45. It also comprises a synchronizer 46 that enables it to synchronize the contents rendering according to what is indicated above. More particularly; the synchronizer identifies the auxiliary data associated with the audio and video flows. It measures in this way the time between the rendering of the two flows. According to the time value, the synchronizer memorizes 42 one of the contents so that the renderings are synchronized. The contents are decoded and synchronized in this way to be delivered to a television set through the TV interface 47. The STB naturally comprises a processor 41 which enables it to implement various applications such as decoding or the synchronizer. Naturally, the synchronized contents could be transmitted to any type of device enabling these contents to be reproduced.

The packets of auxiliary data are now described in detail for the MPEG-2 TS and for the RTP. The fields are indicated in the English language in order to facilitate the reading with respect to the indicated specifications.

Concerning the MPEG-2 TS, the "ETSI TS 102 823 v1.1.1 (2005-11) over Digital Video Broadcasting (DVB); Specification for the carriage of synchronized auxiliary data in DVB transport streams" specification, noted as TS102823, describes a method used to transport, in a transport stream of the DVB type, auxiliary data that must be synchronized with so-called linear data such as audio or video data. It offers the possibility to encode the payload field of the auxiliary data structure under several formats. In particular, the formats used are those indicated in sections 5.2.2 and 5.2.4 of TS102823. These are the Broadcast Timeline Descriptor and the Content Labelling Descriptor. The Broadcast Timeline Descriptor is a linear content element with an inherent timeline that increases at the same rate as its flow. It is used to indicate the value of the timeline. The Content Labelling Descriptor is a means of associating a label, in the form of an identifier, with a content element.

i.e. the packet of auxiliary date comprises the following data: Transport Stream packet header information, Elementary Stream packet header information and auxiliary data structure. The latter comprises the Broadcast Timeline Descriptor and the Content Labelling Descriptor.

The format of the transport packet is such as defined in the ISO/IEC specification 13818-1, section 2.4.3.2. The auxiliary data packet comprises no adaptation field. The PCR is transported in a separate component or in the adaptation field of the audio or video component of the same program. The transport packet fields and values are indicated in the following table:

| Name | No. of bits | Mnemonics | Value | Comment |
| --- | --- | --- | --- | --- |
| Sync_byte | 8 | Bslbf | 0x47 | |
| Transport_error_indicator | 1 | Bslbf | '0' | |
| payload_unit_start_indicator | 1 | Bslbf | '1' | |
| transport_priority | 1 | Bslbf | '0' | |
| PID | 13 | Uimsbf | | |
| transport_scrambling_control | 2 | Bslbf | '00' | TS packet payload not scrambled |
| adaptation_field_control | 2 | Bslbf | '01' | No adaptation_field |
| continuity_counter | 4 | Uimsbf | | |
| PES packet | | | | Defined in the next section |

The format of the Elementary Stream packet is such as defined in the ISO/IEC specification 13818-1, section 2.4.3.6. The fields and values are indicated in the following table:

| Name | No. of bits | Mnemonics | Value | Comment |
| --- | --- | --- | --- | --- |
| packet_start_code_prefix | 24 | Bslbf | 0x000001 | |
| stream_id | 8 | Uimsbf | 0xBD | "Private_stream_1" (*) |
| PES_packet_length | 16 | Uimsbf | | |
| '10' | 2 | Bslbf | '10' | |
| PES_scrambling_control | 2 | Bslbf | '00' | Not scrambled |
| PES_priority | 1 | Bslbf | '0' | No priority |
| data_alignment_indicator | 1 | Bslbf | '1' | (*) |
| Copyright | 1 | Bslbf | '0' | No copyright |
| original_or_copy | 1 | Bslbf | '1' | PES packet payload is an original |
| PTS_DTS_flags | 2 | Bslbf | '10' | PTS field present in the PES packet header |
| ESCR_flag | 1 | Bslbf | '0' | No ESCR field |

-continued

| Name | No. of bits | Mnemonics | Value | Comment |
|---|---|---|---|---|
| ES_rate_flag | 1 | Bslbf | '0' | No ES_rate field |
| DSM_trick_mode_flag | 1 | Bslbf | '0' | No trick_mode field |
| additional_copy_info_flag | 1 | Bslbf | '0' | No additional_copy_info field |
| PES_CRC _flag | 1 | Bslbf | '0' | No CRC field |
| PES_extension_flag | 1 | Bslbf | '0' | No extension field in the PES packet header |
| PES_header_data_length | 8 | Uimsbf | 0x5 | 5 bytes of optional fields (PTS) |
| '0010' | 4 | Bslbf | '0010' | PTS_DTS _flags == '10' |
| PTS [32..30] | 3 | Bslbf | | |
| marker_bit | 1 | Bslbf | '1' | |
| PTS [29..15] | 15 | Bslbf | | |
| marker_bit | 1 | Bslbf | '1' | |
| PTS [14..0] | 15 | Bslbf | | |
| marker_bit | 1 | Bslbf | '1' | |
| Stuffing_byte | | Bslbf | | |
| Auxiliary data structure | | | | Defined in the next section |

The format of the auxiliary data structure is such as defined in the TS102823 specification, section 4.5. The fields and values are indicated in the following table:

| Name | No. of bits | Mnemonics | Value | Comment |
|---|---|---|---|---|
| Payload_format | 4 | bslbf | 0x1 | Payload field consists of 0 or more descriptors |
| Reserved | 3 | bslbf | '000' | |
| CRC_flag | 1 | bslbf | '0' | No CRC field |
| Broadcast timeline descriptor | | | | Defined in section "Broadcast timeline descriptor" |
| Content labeling descriptor | | | | Defined in section "Content labeling descriptor" |

The value of the Payload_format field is 0x1 to indicate that the payload field is one of the descriptors defined in the TS102823 specification, section 5, and more particularly this involves the broadcast timeline descriptor.

The broadcast timeline descriptor is defined in the TS102823 specification, section 5.2.2. According to the embodiment, the broadcast timeline is of the direct type, it is linear and not subject to discontinuities. The value of the Running status field is 'running'. The tick format is 90,000 ticks per second. The fields and values are indicated in the following table:

| Name | No. of bits | Mnemonics | Value | comment |
|---|---|---|---|---|
| Descriptor_tag | 8 | Uimsbf | 0x02 | |
| Descriptor_length | 8 | Uimsbf | 0x08 | Total number of bytes following the byte defining the value of this field |
| Broadcast_timeline_id | 8 | Uimsbf | | |
| Reserved | 1 | Uimsbf | '1' | |
| Broadcast_timeline_type | 1 | Uimsbf | '0' | Direct encoding |
| Continuity_indicator | 1 | Uimsbf | '0' | |
| Prev_discontinuity_flag | 1 | Uimsbf | '0' | No previous discontinuity |
| Next_discontinuity_flag | 1 | Uimsbf | '0' | No next discontinuity |
| Running_status | 3 | Uimsbf | 0x4 | Status is "running" |
| Reserved | 2 | Uimsbf | '11' | |
| Tick_format | 6 | Uimsbf | 0x11 | 90,000 ticks per second |
| Absolute_ticks | 32 | Uimsbf | | |
| Broadcast_timeline_info_length | 8 | Uimsbf | 0x0 | No broadcast timeline info |

Concerning the second embodiment, the broadcast timeline descriptor is different on the following points. The value of the Running status field is 'countdown'. This is a private value which is not specified in the standard. The value of a broadcast timeline information field is 'Prefetch_period_duration_ticks' to indicate the pre-fetch period in number of ticks. An "absolute_ticks" field represents the counter advance. The combination of the value of this field with the 'Prefetch_period_duration_ticks' enables to indicate the moment at which the content will be played. Hence, a value equal to zero means that the content will be played in 'Prefetch_period_duration_ticks' ticks. A 'Prefetch_period_duration_ticks' value means that the content begins to be played. The fields and values are indicated in the following table:

| Name | No. of bits | Mnemonics | Value | Comment |
|---|---|---|---|---|
| Descriptor_tag | 8 | Uimsbf | 0x02 | |
| Descriptor_length | 8 | Uimsbf | 0x0C | Total number of bytes following the byte defining the value of this field |
| Broadcast_timeline_id | 8 | Uimsbf | | |
| Reserved | 1 | Uimsbf | '1' | |
| Broadcast_timeline_type | 1 | Uimsbf | '0' | Direct encoding |
| Continuity_indicator | 1 | Uimsbf | '0' | |
| Prev_discontinuity_flag | 1 | Uimsbf | '0' | No previous discontinuity |
| Next_discontinuity_flag | 1 | Uimsbf | '0' | No next discontinuity |
| Running_status | 3 | Uimsbf | 0x5 | Status is "countdown" |
| Reserved | 2 | Uimsbf | '11' | |
| Tick_format | 6 | Uimsbf | 0x11 | 90,000 ticks per second |
| Absolute_ticks | 32 | Uimsbf | | |
| Broadcast_timeline_info_length | 8 | Uimsbf | 0x4 | |
| Prefetch_period_duration_ticks | 32 | Uimsbf | | |

The format of the Content Labelling descriptor is such as defined in TS102823, section 5.2.4. The fields and values are indicated in the following table:

| Name | No. of bits | Mnemonics | Value | comment |
|---|---|---|---|---|
| Descriptor_tag | 8 | Uimsbf | 0x4 | |
| Descriptor_length | 8 | Uimsbf | | Total number of bytes following the byte defining the value of this field |
| Metadata_application_format | 16 | Uimsbf | 0x4444 | User defined |

-continued

| Name | No. of bits | Mnemonics | Value | comment |
|---|---|---|---|---|
| content_reference_id_record_flag | 1 | Bslbf | '1' | content_reference_id_record is present |
| content_time_base_indicator | 4 | Uimsbf | 0x8 | Use of a DVB broadcast timeline |
| Reserved | 3 | Uimsbf | '111' | |
| content_reference_id_record_length | 8 | Uimsbf | | |
| content_reference_id_data | | | | |
| Time_base_association_data_length | 8 | Uimsbf | 0x2 | |
| Reserved | 7 | Uimsbf | '1111111' | |
| Time_base_mapping_flag | 1 | Uimsbf | '0' | |
| Broadcast_timeline_id | 8 | Uimsbf | | |

The content_reference_id_data field is defined in the following table:

| Name | No. of bits | Mnemonics |
|---|---|---|
| content_reference_id_data ( ) { | | |
| for (i=0; i<N; i++) { | | |
| content_labeling_id_type | 8 | Uimsbf |
| content_labeling_id_length | 8 | Uimsbf |
| for (i=0; i<length; i++) { | | |
| content_labeling_id_byte | 8 | Uimsbf |
| } | | |
| } | | |
| } | | |

The content_labeling_id_type field specifies the identifier type. The values are indicated in the following table:

| Value | Description |
|---|---|
| 0 | Reserved |
| 1 | The content labeling ID is a string |
| 2 | The content labeling ID is a URL |
| 3-0xFFF | Reserved |

The content_labeling_id_length field indicates the length of the content_labeling_id field. The content_labeling_id_byte field identifies the content. The content labeling field can be referenced in the content identifier descriptor such as defined in section 12.1 of standard ETSI TS 102 323 on "Digital Video Broadcasting (DVB); Carriage and signalling of TV-Anytime information in DVB transport streams". This enables the content labeling ID to be made public. That is, an external entity can refer to the content referenced by the timeline associated with the content identifier descriptor without having to analyse the auxiliary timeline component.

Concerning the transport by RTP, the auxiliary data are transported in the payload field part of the RTP packet. The payload field contains a Broadcast Timeline Descriptor and a Content Labelling Descriptor similar to those indicated above. The RTP packet fields and values are indicated in the following table:

BT desc type (8 bits): descriptor type. Value set to 0x2 to indicate that the descriptor is of the broadcast timeline type.
BT desc length (8 bits): broadcast timeline descriptor_length. Represents, for this descriptor, the total number of bytes following the byte which defines the value of this field. Value set to 0x8.
BT Id (8 bits): broadcast timeline Id.
R (1 bit): reserved, '1' value.
T (1 bit): of the broadcast timeline type. Value set to '0' to indicate a direct type encoding.
C (1 bit): Continuity_indicator. Value set to '0' to indicate a linear broadcast timeline not subject to discontinuities.
P (1 bit): Prey_discontinuity_flag. Value set to '0' to indicate that there is no previous discontinuity.
N (1 bit): Next_discontinuity_flag. Value set to '0' to indicate that there is no future discontinuity.
RS (3 bits): running status. Value set to "0x4" to indicate that the status is "running".
res (2 bits): reserved. Value set to '11'.
tick format (6 bits): tick_format. Value set to "0x11" to indicate 90,000 ticks per second.
Absolute ticks (32 bits): absolute ticks value.
Info length (8 bits): value set to 0x0 to indicate that no broadcast timeline info is present.
CL desc type (8 bits): descriptor type. Value set to 0x4 to indicate that the descriptor is of the content labelling type.
CL desc length (8 bits): content labeling descriptor length. Represents, for this descriptor, the total number of bytes following the byte which defines the value of this field.
Metadata application format (16 bits): metadata application format. Value set to 0x4444 to indicate that it is user-defined.
F (1 bit): content reference id record flag. Value set to '1' to signal the presence of a content_reference_id_record in this descriptor.
CTBI (4 bits): content time base indicator. Value set to 0x8 to indicate use of the DVB broadcast timeline.
Res (3 bits): reserved. Value set to '111'
CRIR length (8 bits): content reference id record length. Specifies the number of bytes of the content_reference_id following this field
CLI_type (8 bits): content labeling id type. Specifies the type of content's reference identification.
CLI_length (8 bits): content labeling id length. Specify the length in number of bytes of the content labeling id, i.e. the CLI bytes.
CLI bytes (CLI_length bytes): content labeling id that identifies the content.
TBAD length (8 bits): time base association data length. Set to 0x2.
Reserved (7 bits): reserved. Value set to '111111'.
M (1 bit): time base mapping flag. Value set to '0' to indicate that no explicit mapping from external time base to broadcast timeline is provided.
BT ID (8 bits): broadcast timeline ID the content labeling refers to.

For the second embodiment, the differences in comparison with the preceding RTP packet are indicated below. The RTP packet fields and values are indicated in the following table:

The 'BT desc length' field represents the length of the broadcast timeline descriptor, in particular the total number of bytes following the byte which defines the value of this field. The RS field represents the running status and its value is 'countdown'. The info length field represents the length of the 'broadcast timeline info' field. The Prefetch_period_duration_ticks and 'absolute ticks' fields have the same meaning as in the MPEG-2 TS case indicated above.

Hence, the timeline is based on the same clock whatever the transport protocol and the network used.

The embodiments of the invention are based on two different transport protocols with different timing references. Naturally, the invention applies in the same manner to two identical transport protocols being based on different timing references. Likewise, the first embodiment could be based on two broadband networks or two broadcast networks.

In the embodiments, the synchronization data transmitted in the auxiliary data packets is based on one of the clocks, namely that relating to the MPEG-2 TS. Naturally, this synchronization data could just as well be based on a clock independent of those of the transport protocols.

The embodiments are based on a receiver. Alternatively, the audio and video contents could be rendered in distinct equipment. A first equipment is then considered as the master. It periodically communicates to the second equipment the temporal information corresponding to the commonly rendered content. The synchronizer of the second equipment uses this information as a reference. The communication time between the two equipment is presumed to be known or sufficiently low.

The invention is described in the preceding text as an example. It is understood that those skilled in the art are capable of producing variants of the invention without leaving the scope of the patent. In particular, the embodiment is placed within the framework of a broadcast network and of a broadband network, and for audio and video contents.

The invention claimed is:

1. A method for the processing of multimedia data in a reception device comprising an interface to a first network and an interface to a second network, comprising the following steps of:
   receiving, from the first network, through a first transport protocol, a first flow comprising first multimedia data, and temporal synchronization data related to a timeline for content rendering, said temporal synchronization data being synchronized with the first multimedia data using a synchronization protocol specific to said first protocol;
   receiving, from the second network, through a second transport protocol, a second flow comprising second multimedia data and the temporal synchronization data related to the timeline for content rendering, said temporal synchronization data being synchronized with the second multimedia data using a synchronization protocol specific to said second protocol said second multimedia data being pre-loaded upon request of said reception device to enable the reception device to render it synchronously with the first multimedia data;
   synchronizing the rendering of said first and second multimedia data by using temporal synchronization data related to the timeline for content rendering;
   said method comprising the steps of, prior to rendering said first flow:
   receiving, from the first network, countdown information indicating when the timeline for content rendering to begin, said countdown information being transported in said first flow; and
   issuing, based on said countdown information, said request to receive said second multimedia data before said beginning of the timeline for content rendering, so that said second multimedia data is rendered synchronously with said first multimedia data.

2. The method according to claim 1, said first transport protocol being of the MPEG-2 TS type.

3. The method according to claim 2, said first component being adapted to transport auxiliary data.

4. The method according to claim 3, said first component being a broadcast timeline descriptor.

5. The method according to claim 1, said second transport protocol being of the RTP type.

6. The method according to claim 1, the synchronization step comprising a step for delaying the content received in advance by memorization, until the contents can be rendered synchronously.

7. The method according to claim 1, the first flow being received on the first network in broadcast mode.

8. A reception device comprising
   an interface to a first network for receiving, through a first transport protocol, a first flow comprising first multimedia data, and temporal synchronization data related to a timeline for content rendering, said temporal synchronization data being synchronized with the first multimedia data using a synchronization protocol specific to said first protocol;
   an interface to a second network, for receiving, through a second transport protocol, a second flow comprising second multimedia data and the temporal synchronization data related to the timeline for content rendering, said temporal synchronization data being synchronized with the second multimedia data using a synchronization protocol specific to said second protocol said second multimedia data being pre-loaded upon request of said reception device to enable the reception device to render it synchronously with the first multimedia data;
   a synchronizer for:
      synchronizing the rendering of said first and said second multimedia data by using temporal synchronization data related to the timeline for content rendering;
      receiving, from the first network, countdown information indicating when the timeline for content rendering is to begin, said countdown information being transported in said first flow; and
      issuing, based on said countdown information, said request to receive said second multimedia data before the beginning of timeline for content rendering, so that said second multimedia data is rendered synchronously with said first multimedia data.

* * * * *